Oct. 19, 1948.　　　　　F. C. LORNITZO　　　　2,451,844
PRESSING MACHINE AND LINKAGE MECHANISM
FOR TRANSMITTING AND TRANSFORMING
FORCE FOR USE THEREIN
Filed Oct. 18, 1941　　　　　　　　　　　　10 Sheets-Sheet 1

Inventor
Frank C. Lornitzo
By Thomas A. Jenckes
Attorney

Oct. 19, 1948.  F. C. LORNITZO  2,451,844
PRESSING MACHINE AND LINKAGE MECHANISM
FOR TRANSMITTING AND TRANSFORMING
FORCE FOR USE THEREIN
Filed Oct. 18, 1941  10 Sheets-Sheet 2

Inventor
Frank C. Lornitzo
By Thomas A. Jenkins
Attorney

Oct. 19, 1948.  F. C. LORNITZO  2,451,844
PRESSING MACHINE AND LINKAGE MECHANISM
FOR TRANSMITTING AND TRANSFORMING
FORCE FOR USE THEREIN

Filed Oct. 18, 1941  10 Sheets-Sheet 3

Inventor
Frank C. Lornitzo
By Thomas A. Jenckes
Attorney

Oct. 19, 1948.　　　F. C. LORNITZO　　　2,451,844
PRESSING MACHINE AND LINKAGE MECHANISM
FOR TRANSMITTING AND TRANSFORMING
FORCE FOR USE THEREIN

Filed Oct. 18, 1941　　　　　　　　　　10 Sheets-Sheet 4

Inventor
Frank C. Lornitzo
By Thomas A. Jenckes
Attorney

Oct. 19, 1948.  F. C. LORNITZO  2,451,844
PRESSING MACHINE AND LINKAGE MECHANISM
FOR TRANSMITTING AND TRANSFORMING
FORCE FOR USE THEREIN.

Filed Oct. 18, 1941  10 Sheets-Sheet 7

Inventor
Frank C. Lornitzo
By Thomas A. Juncks
Attorney

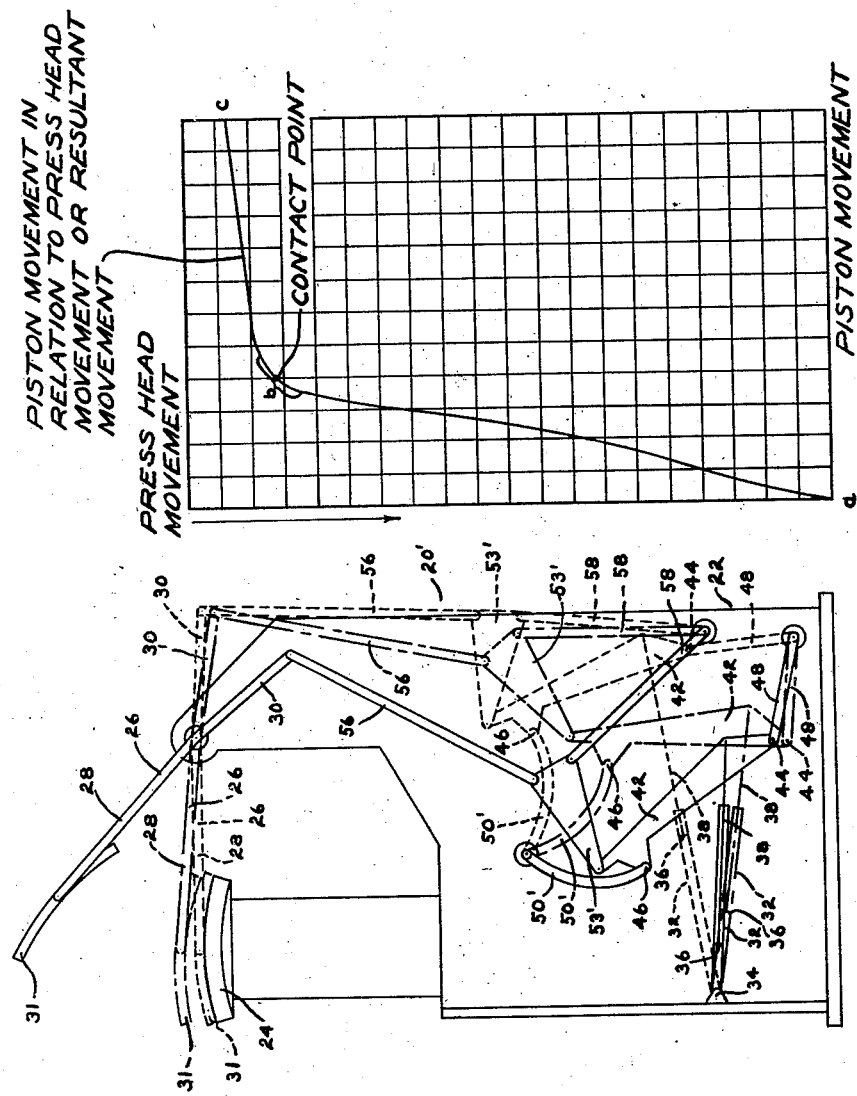

Patented Oct. 19, 1948

2,451,844

UNITED STATES PATENT OFFICE 2,451,844

PRESSING MACHINE AND LINKAGE MECHANISM FOR TRANSMITTING AND TRANSFORMING FORCE FOR USE THEREIN

Frank C. Lornitzo, Pawtucket, R. I., assignor, by mesne assignments, to Pantex Manufacturing Corporation, a corporation of Delaware Application October 18, 1941, Serial No. 415,600

10 Claims. (Cl. 38—41)

My invention relates to improvements in garment pressing machines and particularly mechanisms for transmitting and transforming force comprising levers and links for use in transmitting and transforming the input force applied thereto to the output force supplied thereby to the pressing head.

I am aware that any number of combinations of levers and linkages have been used in the prior art, but so far as I am aware, these have been subject to the following disadvantages: Inasmuch as the piston moves outwardly in the cylinder to supply the power in a power press, exerting a substantially even force, if its force were transmitted directly to the pressing head, it is apparent the pressing head would move with even accelerated velocity up to the point of contact with the buck, the impact of the pressing members at this high velocity resulting in a sharp shock; inasmuch as in prior art linkage systems with single point connections the relative force acting on the pressing head would not only remain constant but would tend to increase during the closing movement of the pressing head, the impact of the pressing head would be even greater. To overcome the shock at the instant of contact of the pressing head with the pressing buck, various types of leverage mechanisms have been devised, and various types of braking mechanisms or cushioning devices to control the velocity, force and movement of the pressing head as it strikes the buck have been devised. These have tended to increase the time required for the pressing head in its downward movement to close the press, resulting in slowness of operation of the press during its closing period.

A further disadvantage of the prior art linkage systems with single point connections is due to the continuous change or increase of the relative force or multiplication factor of leverage of the linkage system during the pressing period resulting in unstable pressing conditions during the pressing period and making determination of the actual pressure at the end of the pressure stroke impossible and the actual pressure obtained dependent upon the compression qualities of the padded buck surface.

Another disadvantage of the prior art linkage systems with single point connections arising out of the instability of the power multiplication factor of the mechanism during the pressure stroke is the necessity for very frequent readjustments of the spacing between the pressing head and the buck to make up for the loss of thickness of the buck pad during its continuous use, resulting in the loss of pressure unless frequent re-adjustments of the spacing between the pressing head and buck are made.

A further disadvantage of the prior art single point connection linkages resides in the fact that speed regulating mechanisms, such as dash pots, brakes, throttling of the fluid supply, etc., must be employed to absorb the excessive power used in the press closing period, to prevent the pressing head from obtaining too high a velocity at the moment of contact to prevent harmful shocks to the mechanism and also to prevent disarrangement of the garment being ironed or pressed by the air current caused by the too rapid displacement of the air between the pressing head and the buck at the moment the pressing head moves into close proximity to the buck, the excessive power absorbed by the dash pots, brakes or overbalancing means representing waste of power.

Objects of my invention, therefore are to provide a mechanism for transmitting and transforming force, comprising levers and links so selected and adjusted as to overcome at least some of these objections to prior art structures and to supplementally provide a device which will function to fulfill the requisites desired in a mechanism of this type.

A further object of my invention is to provide a device which will transform the input force into the necessary amount of output force desired for optimum operating conditions at various stages of the operation of the press to obtain maximum efficiency from the input force without the loss of any mechanical work lost in prior art structures by the various types of braking mechanisms formerly thought necessary. For this purpose I preferably employ power applying lever means pivotable substantially entirely on a single closing movement fulcrum to function as a lever having one characteristic to apply a rapid movement and a small force to said pressing head and pivotable substantially entirely on another power applying fulcrum to function as a lever having different characteristics to apply a slow movement and a large force to said pressing head, during the outward stroke of said piston, and I employ rigid interconnecting and guide means, preferably comprising links, for automatically rapidly transmuting the leverage characteristics of said lever means for rapidly changing the respective power transmitting fulcrums of said lever means after a predetermined pivotable movement thereof, certain of said link means also preferably functioning as guide means and/or power transmitting means. An object of my invention employing such a structure is to provide said lever means with one characteristic effective to close the pressing head in the most efficient manner and another characteristic effective to apply a constant pressing pressure for optimum efficiency during the pressing period, and a rapid fulcrum changing transmutation period during which the effective leverage characteristics are rapidly changed, and in the course of which said pressing head contacts said buck. As shown in the joint application Ser. No. 415,778 entitled Pressing machine and multiple lever linkage mechanism for transmuting and transforming force for use therein filed Oct. 20, 1941, by the applicant herein and Herbert G. Beede, these results may be accomplished by having two separate lever means, but in the embodiments of my broad invention shown herein, I preferably accomplish these results by a single floating fulcrum changing lever.

It is apparent that during the closing of the press, to avoid injury, it is desirable to apply as light a force as possible to the pressing head, and it is also apparent for the sake of efficiency that it is desirable to have the movement of the pressing head as rapid as possible during said closing period. As stated hitherto, it is also desirable that the relative velocity of the movement of the pressing head be as rapid as possible during as much of its closing period as possible, but that its relative velocity when it contacts the buck should be reduced to that at which it can safely contact the buck without disarrangement of the garment being pressed, and thus, through the medium of the selection of the leverage employed during the closing period and its method of connection and manner of being guided, I am able to achieve all these results in the closing period of the pressing head. By picking out an arrangement suitable for this purpose, it is possible to control the velocity of the pressing head without the necessity of employing any braking means of the types formerly used, to impair the speed and efficiency of the linkage mechanism.

As stated, it is also desirable during the force applying period to have the pressing force applied to the garment being pressed as large as is consistently possible, but above all to secure an even pressing action for optimum pressing efficiency to have it constant during the pressing period. By the selection and arrangement of the leverage having a characteristic suitable to achieve these results during the pressing period, I am able to accomplish these desirable results.

As stated hitherto, it is desirable to close the press as rapidly as possible with as little force as possible and it is also desirable that the effective leverage characteristics acting upon the pressing head during the pressing period, namely the application of a greater pressing force, take effect as rapidly as possible once the head has contacted the buck. By providing a short transmutation period in changing from one effective leverage to the other, I am able to speed up the transition between these two periods without impairing the efficiency of the pressing operation during either period. As shown in the diagrams, and as will be apparent, in the parlance of motion pictures, during this transmutation period, the characteristics of the first leverage "fade out" and the characteristics of the second leverage "fade in." This result is highly desirable as it results, even during this extremely short transmutation period, in a rapid increase of force applied by the pressing head to cause it to immediately start to function in its pressing operation with desirable efficiency at the instant the head contacts the buck. It is also obvious that the press closes rapidly in a desirable manner almost to the moment it contacts the buck due to the rapidity of this short transmutation period, the transmutation of movement from fast to slow motion taking place rapidly during said period.

A further object of my invention is to provide a linkage system which will function in accordance with a predetermined movement curve, a predetermined force or multiplication factor of leverage curve and/or a predetermined relative velocity curve. It is apparent that by providing a device which will function in accordance with these respective curves I am able to design a device which will function with optimum efficiency in accordance with a theoretical curve and actually construct a device in accordance with said curve and continuously reproduce identical devices. In the manufacture of the linkages the trial and error method is usually employed. When a trial device is assembled, its respective curves may be plotted or otherwise constructed and corrected until the device functions in accordance with the desired theoretical curve.

As stated, I am able to achieve all these desirable results through the proper selection and manipulation of a single floating lever.

A further object of my invention is to employ rigid links, and in order that a small plurality of rigid links may be employed, I preferably employ them whether one or more levers be employed, said links having transmutable functions functioning prior to the transmutation of the leverage characteristics as either fulcrum or guides and vice versa after the transmutation of the leverage characteristics, in the embodiments shown in this application functioning alternately as fulcrums and guides respectively, before and after the transmutation of the leverage characteristics and functioning alternately either as fulcrums or power transmitting means and guides respectively, before and after the transmutation of the leverage characteristics, in the embodiments shown in the joint application aforesaid. It is apparent that by making the same links perform different functions during the actuation of the mechanism, I am able to cut down the number of inherent parts necessary for the successful operation of my invention.

It is apparent that whether one or more levers be employed mounted on floating or fixed pivots, at least certain of the links must be mounted on certain definite fixed pivots, and a further object of my invention is to provide a device wherein the linkage may be changed, as is necessary in employing a different type of head requiring less force in the pressing operation and still have it mounted on the same fixed pivots.

A further object of my invention is that I am able to provide a device from which varying leverages may be successively obtained from a minimum number of parts easily assembled in a small compass to make them readily attachable on the relatively small space available on a garment pressing machine.

A further object of my invention is to provide a mechanism having low frictional loss.

A further object of my invention is to provide a device as will be apparent from the curve having an increasing movement during the pressing operation, as called in the trade a "follow up" motion, so that as the padding wears down in use it will still function with the same pressure without re-adjustment or replacement.

I am aware that somewhat analogous results have been provided in the prior art by the use of cam structures. As stated hitherto, my improved mechanism consists solely of power applying lever means and rigid links pivotally connected at single points and controlled in their movement. It is apparent that the types of levers and links required are easier to make than to cut a suitable cam. It is also apparent that due to the fact that they are pivotally connected together by single point connections spread over a plurality of surfaces they wear less than a single cam and achieve an analogous purpose. It is also apparent that after a considerable amount of use and distributed wear, their force transforming and leverage characteristics are retained, whereas with all the wear on a single irregular cam surface they are not. It is also apparent that changes in effective transformation of force can be made by merely changing the points of connection of the levers and links without having to totally discard a member or any portion thereof, as is necessary in cams. It is also apparent that in employing simple levers and links it is possible to obtain a rapid transmutation period on devices which will function in the desired manner without excessive strain or wear thereon, whereas to obtain the same result in a cam, an extremely irregular cam having a sharp point is required, which not only is noisy in its operation and tends to strain the various parts in use, but also is subject to extensive wear in use.

These and such other objects of my invention as may hereinafter appear will be best understood from a description of the embodiments thereof shown in the accompanying drawings.

In the drawings, Figs. 1-3 are side elevations of a garment pressing machine constructed in accordance with one embodiment of my invention, Fig. 1 showing the garment pressing machine in open position, Fig. 2 showing the garment pressing machine in the initiation of the transmutation period showing the pressing head about to contact the buck and Fig. 3 showing the pressing machine closed in pressing position.

Figure 6:
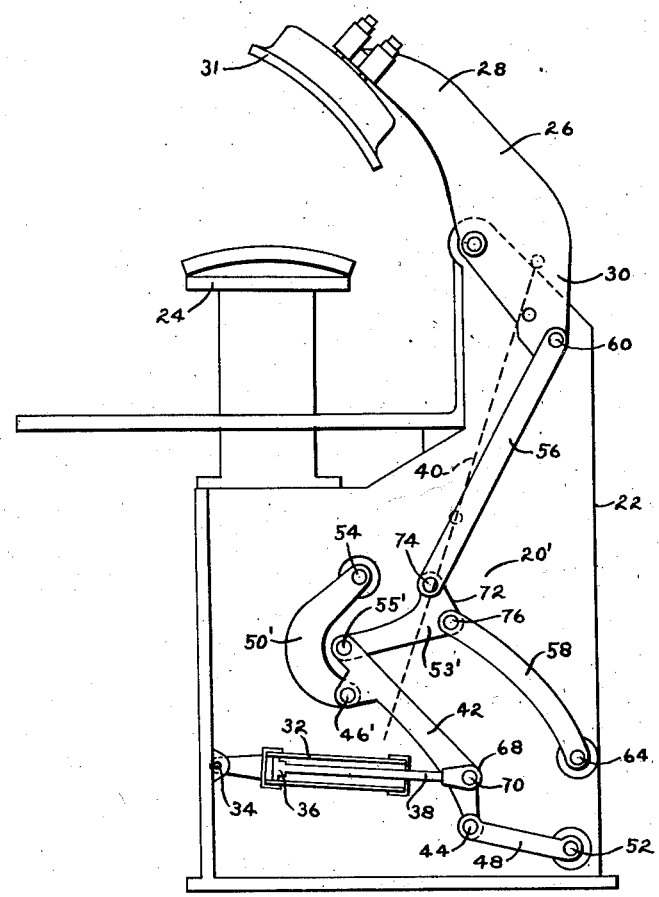
Figure 7:
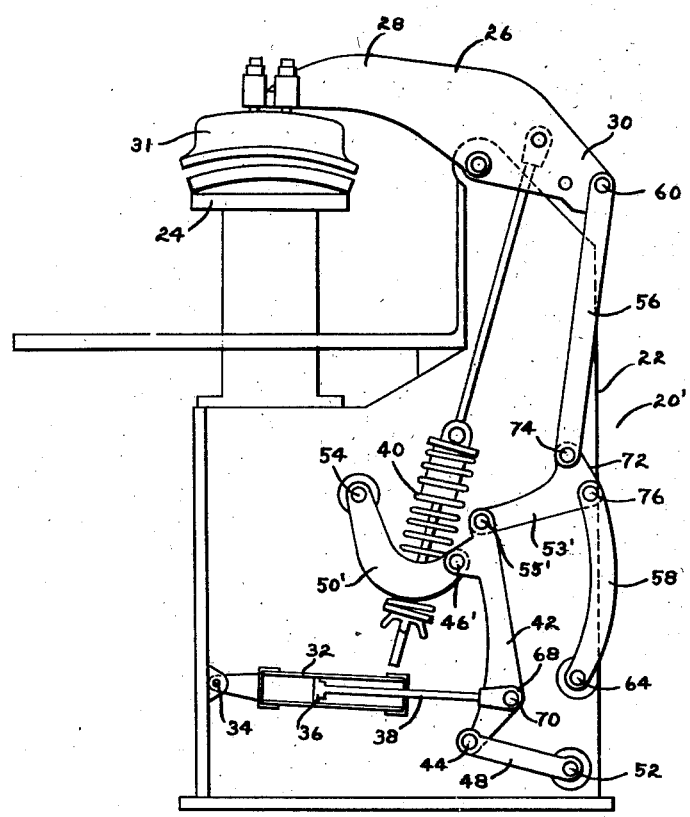
Figure 8:
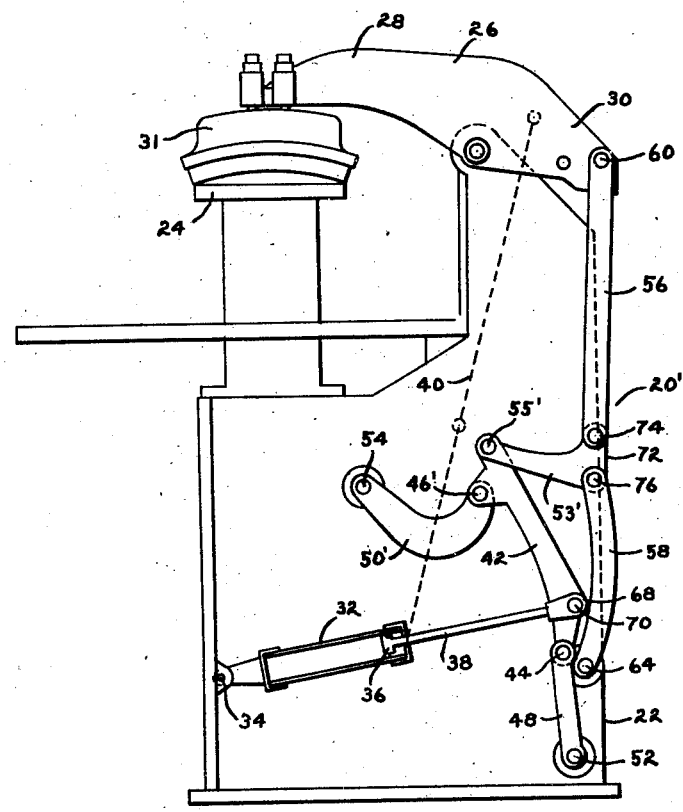

Figs. 6-8 are side elevations of a garment pressing machine constructed in accordance with a different embodiment of my invention, Fig. 6 showing the garment pressing machine in open position, Fig. 7 showing the garment pressing machine in the initiation of the transmutation period showing the pressing head about to contact thte buck and Fig. 8 showing the pressing machine closed in pressing position.

Fig. 9 is a diagrammatic view illustrating component parts of the press and linkage shown in Figs. 6-8 showing the press in open position in full lines, in the intermediate position shown in Fig. 7 in dot-dash lines, and in closed position in dotted lines.

Fig. 10 illustrates a graph or chart showing the curve provided by the embodiment of my invention shown in Figs. 6-8 employing the amount of piston movement as abscissa and the amount of pressing head movement as ordinates.

Figure 11:
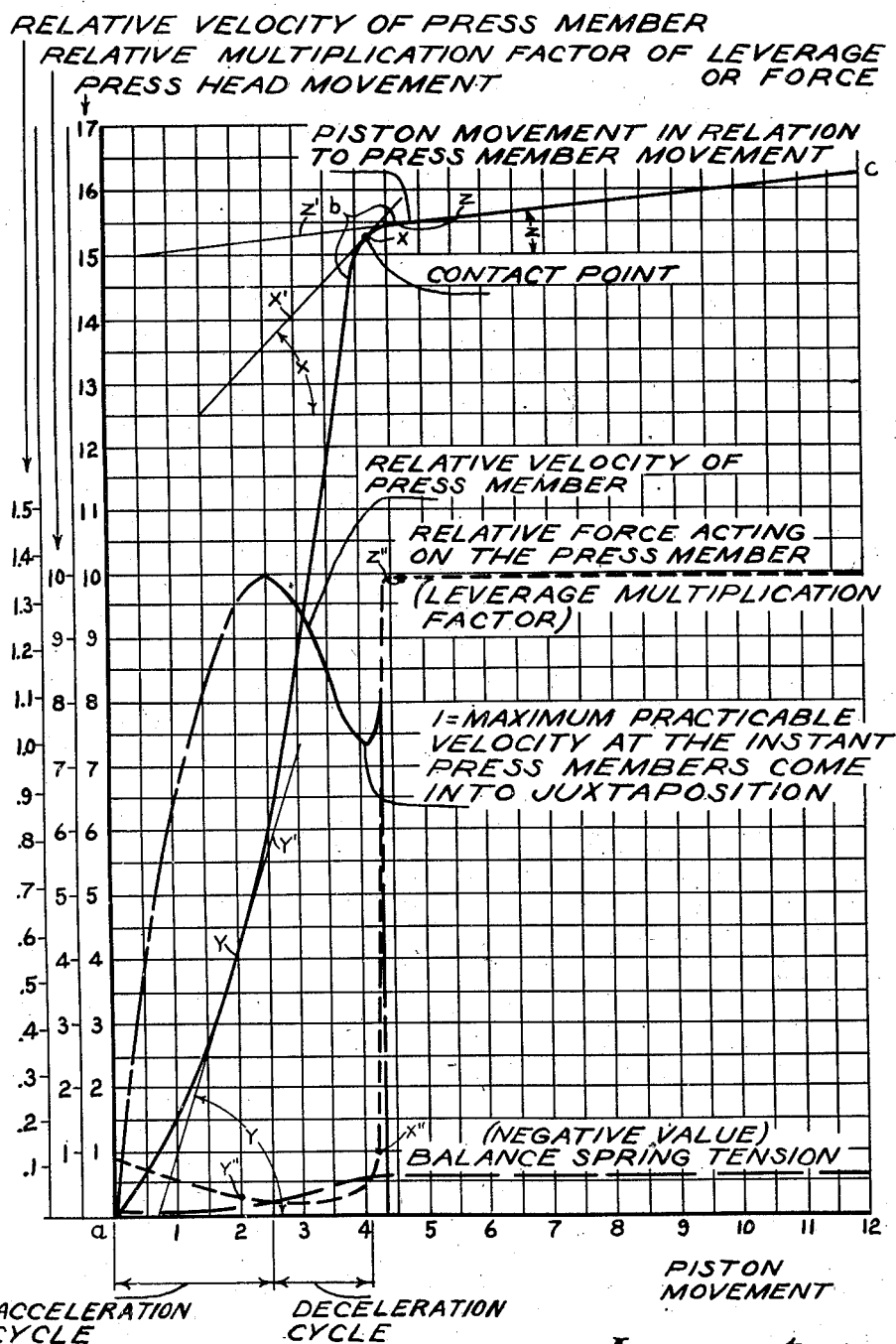

Fig. 11 is a composite graph illustrating the motion curve in full lines, the force or multiplication factor of leverage curve in dotted lines, the relative velocity curve in dash-dot lines and the balance spring tension curve in dash lines produced by all embodiments of my invention.

Figure 12:
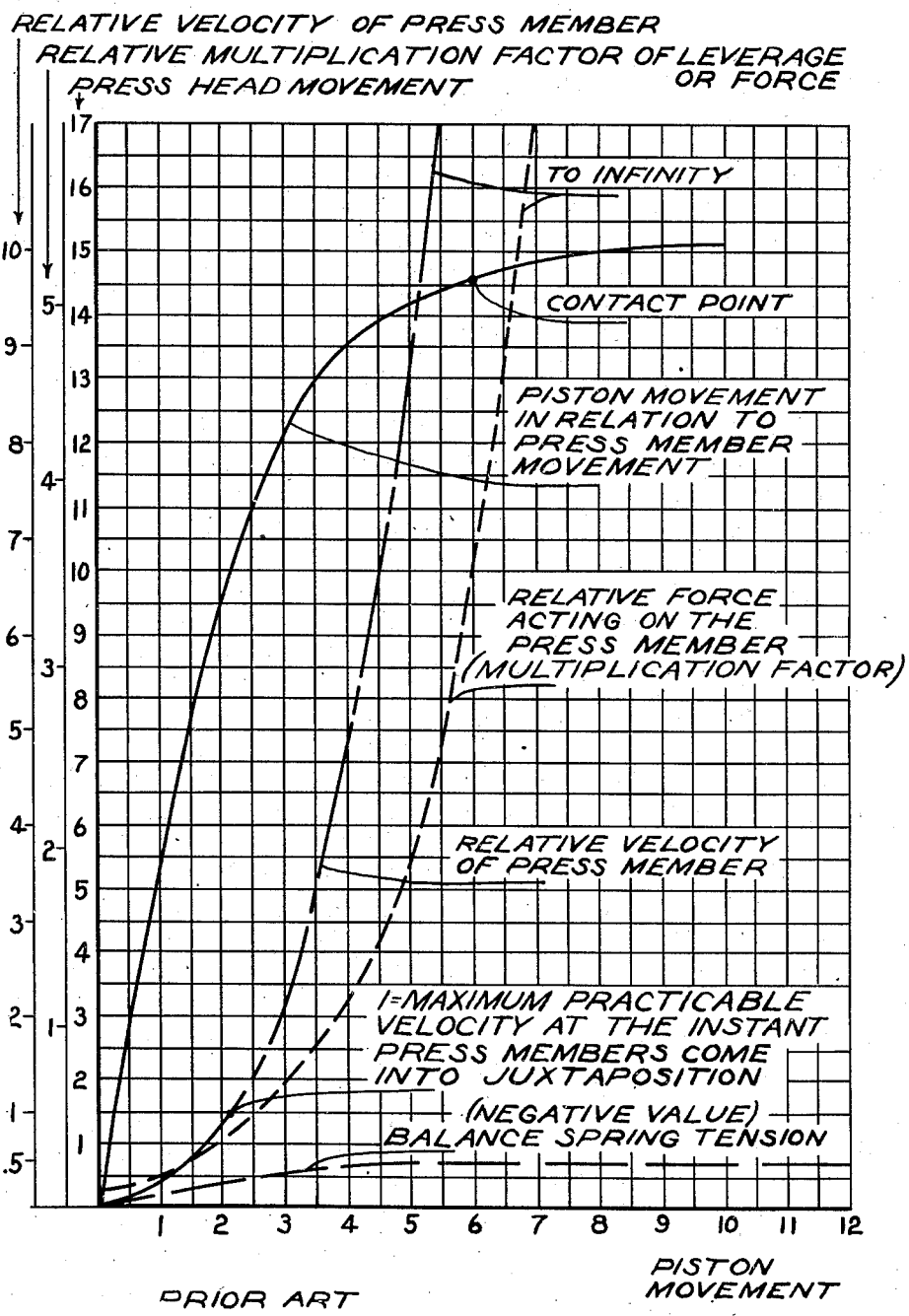

Fig. 12 is a composite graph showing the motion curve in full lines, the force or multiplication factor of leverage curve in dotted lines, the relative velocity curve in dash-dot lines and the balance spring tension curve in dash lines of typical prior art transmitting and transforming linkage systems for the same purpose.

Figure 5:
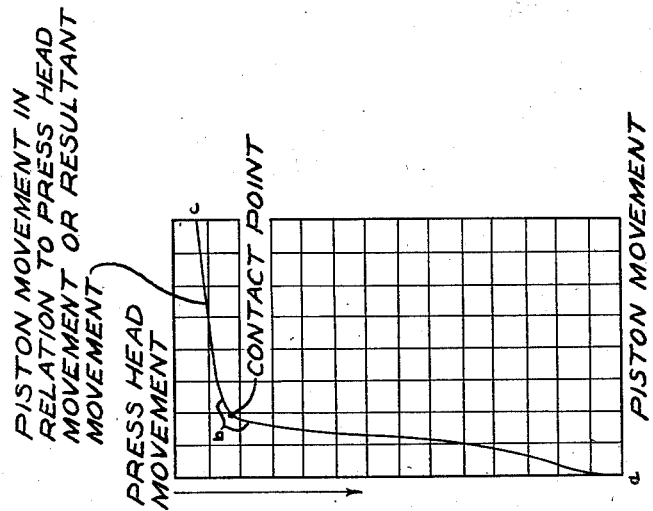
Fig. 5 illustrates a graph or chart showing the curve provided by the embodiment of my invention shown in Figs. 1-4, employing the amount of piston movement as abscissa and the amount of pressing head movement as ordinates.

In the drawings, wherein like characters of reference generally indicate like parts throughout, 20 or 20' respectively generally indicates a mechanism for transmitting and transforming force constructed in accordance with my invention. As stated hitherto, the specific types of such mechanisms shown are particularly designed and adapted for use to solve the problems inherent in a garment pressing machine, although it is apparent that my improved force transmitting and transforming mechanisms may, if desired, be employed for other types of presses or for other uses, said mechanisms being specifically designed to function in accordance with the curves shown in Fig. 11, the mechanism shown in Figs. 1-4 having a movement curve slightly varying therefrom, as shown in Fig. 5, and the mechanism shown in Figs. 6-9 having a movement curve slightly varying therefrom as shown in Fig. 10.

Figure 1:
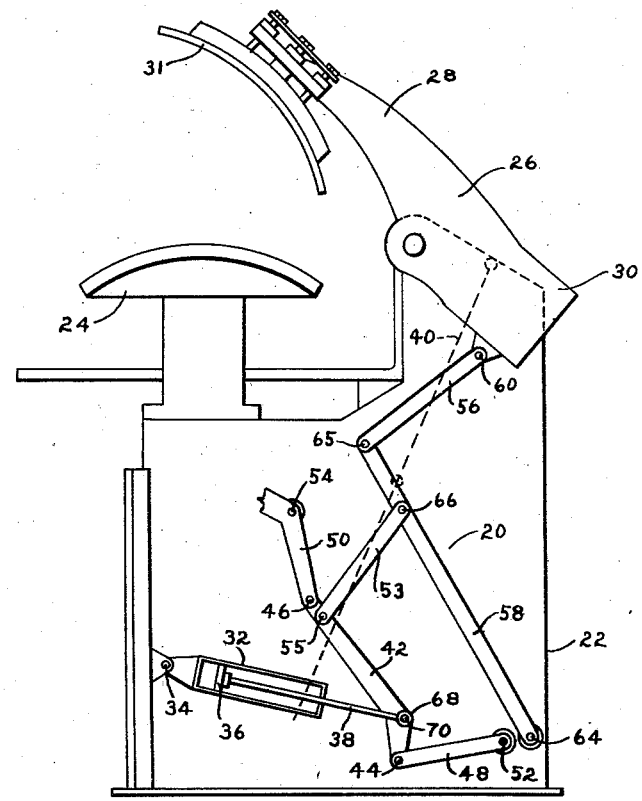
Figure 2:
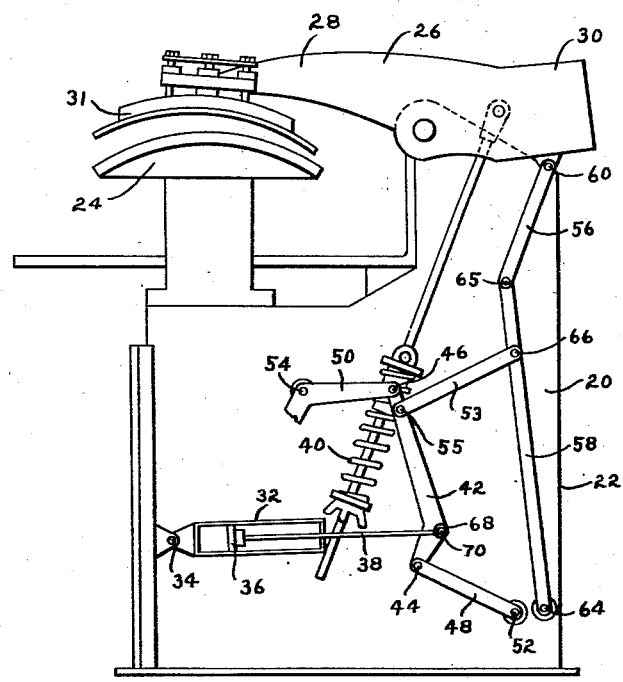
Figure 3:
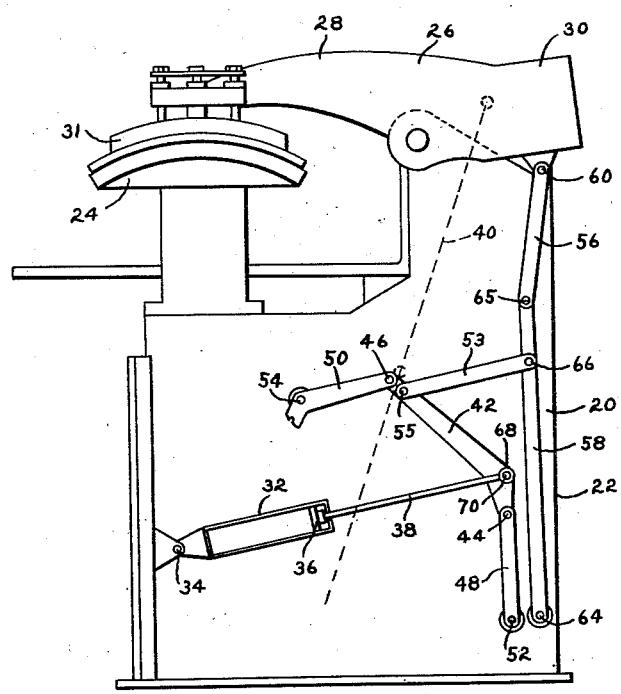

Any suitable type of a power driven garment pressing machine may be employed, as in the embodiment shown in Figs. 1-3 and as in the embodiment shown in Figs. 6-8. As shown in said figures, such a standard type of garment pressing machine includes a frame 22, a pressing buck 24 mounted on said frame, a pressing lever 26 pivotally mounted on said frame having a work arm 28 and a power arm 30 and a pressing head 31 mounted on said work arm to move to a closed position into pressing contact with said buck 24 as shown in Figs. 3 and 8 and to an open position away therefrom as shown in Figs. 1 and 6. As the motive force for the power press, a suitable fluid motor is preferably employed comprising a cylinder 32 pivotally mounted as at 34 on said frame 22 having a piston 36 having a piston rod 38 projecting outwardly therefrom. Suitable means are provided to urge said pressing lever to an open position, in the embodiments shown, comprising the compression spring 40 suitably operatively connected to said power arm 30.

As stated hitherto, I employ mechanism 20 or 20' connecting said piston rod 38 and said pressing lever power arm 30, consisting solely of power applying lever means 42 and rigid links so pivotally interconnected by single point connections and controlled in their movement to respectively transmit to said pressing head 31 the even force supplied by the outward stroke of the piston 36 against the force of said urging means 40 while actuating said pressing lever 26, while transforming it into the following, as illustrated by the curves shown in Fig. 11, namely into (a) a relatively extremely light force applied to said pressing head 31 during its closing period and a relatively extremely heavy substantially constant force applied to said pressing head 31 during its pressing period after an extremely short intermediate rapid force increasing transmutation period, in the course of which said pressing head 31 contacts said buck 24, as illustrated by the curve shown in dotted lines in Fig. 11; (b) also transforming said even force to cause an extremely rapid relative movement of said pressing head 31 during its closing period and a relatively slow movement of said pressing head 31 during its pressing period after said extremely short intermediate transmutation period, as illustrated by the full line curve shown in Fig. 11; and (c) also transforming said even force to cause during said closing period an initial sharp increase in the relative velocity of movement of the pressing head 31 and a substantial drop in the relative velocity of said movement of the pressing head 31 to a velocity at which it can safely contact the buck 24 without disarrangement of the garment being pressed just prior to contact with the buck 24, as shown by the dash-dot line curve in Fig. 11. As will be apparent from said respective curves, the dotted line curve shown therein represents the ratio of force exerted by the piston to the force exerted by the pressing head, which, as shown by said dotted line curve varies in accordance with my invention in accordance with said curve in which the relative ratio of force exerted by the pressing head 31 to the force exerted by the piston 36 is less than 1 during the press closing period, increases multifold during an extremely short transmutation period in the course of which said pressing head 31 contacts said buck 24 and remains substantially constant at said high ratio during the pressing period. As also shown by the full line curve shown in Fig. 11, the ratio of piston movement and pressing head movement varies in accordance with said curve wherein the relative ratio of the movement of the pressing head 31 to the movement of the piston 36 is substantially greater than 1 during the press closing period and after said extremely short transmutation period in the course of which said pressing head contacts said buck, remains substantially constant during the pressing period. As also shown by the dash-dot curve shown in Fig. 11, the ratio of the velocity of the pressing head movement also varies in accordance with said dash-dot line curve in the manner previously explained. I believe I am the first, therefore, to cause these respective ratios to vary during said respective periods in accordance with predetermined designed or plotted theoretical curves.

It is a principle of the mechanics of leverage systems that the product of any movement and applied force is equal to the product of any other movement and applied force, in other words that at any instant the input force supplied to the piston times the movement of the piston equals the output force supplied by the pressing head times the movement of the pressing head. This relationship can be expressed by a graph if either the relative movements of the piston and the pressing head or relative forces applied by the piston and pressing head be plotted. Thus to get the corresponding movement or force at any one instant, it is merely necessary to draw the tangent to the movement curve at that particular point, and the co-tangent of the angle formed by the extension of said tangent and the abscissa or any line parallel thereto or the angle of slope of the movement curve at said point represents and indicates the corresponding point in the force curve or vice versa, and thus having once plotted the relative movement or the relative force curves, the corresponding curve can be figured through the medium of their respective cotangents. It is also apparent that once the relative multiplication factor of leverage or force curve is obtained, the relative velocity of press member curve may be readily obtained therefrom for any particular period by plotting the acceleration or deceleration of velocity of the press member at different successive periods as evidenced by the plotted force curve. Thus if either the movement curve, the force curve or the relative velocity curve can be theoretically predeterminedly designed or plotted or measured, the other corresponding curves may be readily figured therefrom.

If desired, however, the movement curve may be readily obtained by moving the linkage mechanism a desired unit amount and actually measuring the relative input and output movements and plotting its respective point and repeatedly moving the linkage mechanism additive amounts, preferably multiple amounts of the previous movement, and measuring and plotting those respective points until the desired movement curve as shown in Fig. 11 is made up. Assuming that the movement curve has been measured in accordance with said method or otherwise, as shown in Fig. 11, if the tangent to said curve be drawn at any one point, such as the contact point $x$, as evidenced by the tangent $x'$, the co-tangent of the angle $x$ formed by the extension of said tangent and the abscissa or any line parallel to the abscissa will give the proper value from which the complementary point in the force curve may be plotted. Inasmuch as the angle at the point $x$ is 45°, it is apparent that its co-tangent will be 1, namely the contact point $x''$ shown in the force curve. I have also illustrated in the drawing how the complementary point $y''$ in the force curve may be figured from the corresponding point $y$ in the movement curve. The tangent $y'$ to the movement curve at the point $y$ carried down to the abscissa produces the angle $y$ shown. The co-tangent of this angle is less than one-half as indicated by the complementary point $y''$ on the force curve.

I have also illustrated in the drawings how the corresponding point $z''$ in the force curve may be figured from the coresponding point $z$ in the movement curve, in this instance being the point $z$ at the termination of the curve $b$ representing the short transmutation period. In this instance the tangent $z'$ to the movement curve at the point $z$ carried down to the abscissa produces the angle $z$ shown, and in the curve shown in Fig. 11, coincides with the relative straight oblique line of movement $bc$ of the movement curve shown in full lines. The co-tangent of the angle $z$ is substantially 10, as indicated by the corresponding point $z''$ on the force curve. Inasmuch as the angle $z$, therefore, remains constant for any point in the straight line $bc$, it is obvious that its corresponding point figured from its co-tangent will be in alignment with the corresponding point in the force curve figured from its co-tangent to form a straight line in the force curve as shown therein substantially beyond said point $z''$ graphically bringing out the fact that the pressing head acts with even force during the pressing period. By similarly plotting a sufficient number of points on the force curve, the force curve may be readily figured. Insofar as the relative velocity of press member curve is concerned, it is obvious that if the force acting on the press member is maintained constant during the closing period, said velocity would increase in a substantially straight line extending upwards from zero at a slight angle as substantially a continuation of the straight line shown up to the unit 1. As shown by the force curve, however, the acceleration of force decreases substantially up to the contact point, causing the relative velocity curve to correspondingly decrease, as shown up to a point substantially midway where the force of the balance spring tension hereinafter described overlaps and counterbalances the force curve as shown to reduce the relative velocity of the press member so that it can safely contact the buck without disarrangement of the garment being pressed. If, however, either the relative velocity or the relative force curves are initially designed, figured or plotted first, it is apparent that the corresponding curves may be readily figured or plotted therefrom. For the curves shown in Fig. 11, in making up the movement curve, the same units of movement are applied for ordinates and abscissa; in making up the relative multiplication factor of leverage or force curve the same units of force are applied for ordinates and abscissa. In making up the relative velocity of press member curve however, the abscissa units represent fractions of the time interval of total piston travel, whereas the ordinate units comprise the maximum practical velocity of the pressing head the instant the press members come into juxtaposition taken as 1 (in this instance not corresponding to the regular ordinate divisional lines). For the curves shown in Fig. 12, however, in making up the movement curve, the same units of movement are also applied for ordinates and abscissa; in making up the relative multiplication factor of leverage curve, however, the ordinate units are exaggerated relative to the abscissa units to more accurately represent the curve and in making up the relative velocity of press member curve, the velocity unit scale for making up the ordinates thereof is reduced in length from the units shown in Fig. 11, still, however, employing the maximum practical velocity of the pressing head at the instant the press members come into juxtaposition as 1. Slightly different scales are employed in Figs. 5 and 10. I have shown in Fig. 12 what such respective curves are made by typical linkages employed for this purpose in the prior art without any braking mechanisms. As shown in full lines in Fig. 12, the movement curve decreases rapidly prior to the contact point, thereby increasing the time interval required for closing the press. As shown by the force curve or the multiplication factor of leverage curve shown in dotted lines and by the relative velocity of the pressing head curve shown in dash-dot lines, both the force of the pressing head and relative velocity of force tend to increase to infinity. It is therefore absolutely essential to employ braking mechanisms on the prior art structures. For convenience I have also indicated the maximum practical velocity at the instant the press members come into juxtaposition illustrating with what loss of efficiency said structures had to be braked. An inspection of the dotted line curve shown in Fig. 11, however, will demonstrate that the relative multiplication factor of leverage or force curve provided by my invention is very small right up to the contact point of the head with the buck, the condition desirable for safety during the press closing period, then increases rapidly during the transmutation period and then remains substantially constant during the pressing period for optimum even pressing during the pressing period. I have also shown in the drawings in dash lines the balance spring tension curve which is substantially the same in both the prior art devices and my invention. In Fig. 11, however, one factor is extremely interesting, namely that when the closing period nears its completion, the effective force of the pressing head becomes temporarily less than the tension of the balance spring so as to cause a positive slowing down of the relative velocity of the press member, as shown by the dot-dash line, to have it travel substantially at the instant the pressing head 31 contacts the buck 24 at a velocity insufficient to disarrange the garment being pressed.

As stated hitherto, my improved force transmitting and transforming mechanism 20 or 20' preferably includes power applying lever means 42 pivotable substantially entirely on one lowering movement fulcrum 44 to apply a rapid small force movement to said pressing head during the closing period and pivotable substantially entirely on another power applying fulcrum 46 to also apply a slow large force movement to said pressing head during the pressing period and rigid link means for automatically rapidly transmitting the leverage characteristics of said lever means by rapidly changing the respective power transmitting fulcrums 44 and 46 of said lever means 42 after a predetermined pivotable movement thereof to cause the rapid transmutation period during which the force applied to the pressing head 31 increases rapidly, as hitherto described. As shown by the full line curve in Fig. 11, the transmutation period comprises substantially the length of the sharply curved portion $b$, whereas the portion $ab$ of the curve in front of said transmutation period illustrates the movement during the closing period and the portion $bc$ after said curved portion $b$ illustrates the movement during the pressing period, the length of said sharply curved portion $b$ defining the transmutation period in the other force and relative velocity curves shown therein. It will be observed that the point $x$ marked "contact point" is made substantially half way of said curve $b$, illustrating that the head contacts the buck in the latter half of this rapid transmutation period. Looking at the matter another way, during the closing period the power applying lever means 42 has one type of effective leverage characteristics and during the pressing period has a different type of effective leverage characteristics. As will be apparent from said joint application aforesaid, where two separate levers are employed, they may be so connected up in accordance with said invention to produce substantially identical curves as those shown herein.

In the embodiments shown in this application, said floating power applying lever 42 is preferably bent, has the power applied to the bent portion 68 thereof and functions as a lever of one class with one type of leverage characteristics to apply a rapid movement and a small force to said pressing head 31 while pivoting on a single closing movement fulcrum pin 44, and then successively functions as a lever of a different class having an entirely different type of leverage characteristics to apply a slow movement and a large force to said pressing head 31 while pivoting on a single different power applying fulcrum pin 46, during a single outward stroke of the piston 36. To guide the movement of the pressing head 31, I employ a pair of guide means or links 48 and 50 respectively pivotally mounted on single points 52 and 54 on said frame and connected to said floating lever 42 at said single fulcrum points 44 and 46, one of said guide means, namely the guide means 48, functioning to act as a closing movement fulcrum 44, and the other of said guide means, namely the guide means 50, functioning successively to act as a pressing movement fulcrum 46, each of said guide means 48 and 50 functioning to guide said floating lever 42 while pivoting on the other respective fulcrums 46 or 44, and both of said guide means 48 and 50 functioning to guide said floating lever 42 to rapidly change the respective fulcrums 44 and 46 thereof to provide the short transmutation period b in which the functioning characteristics of said floating lever 42 rapidly change from those of the respective classes.

I also employ power transmitting means pivotally connected to said floating lever at a single point and to the pressing head at a single point. In the embodiments shown, said power transmitting means comprises a connecting link 53 pivotally connected to a respective point 55 on said floating lever 42 and to the toggle links 56 and 58, the upper toggle link 56 being pivotally connected to the power arm 30 of the pressing lever by the single point connection 60 and the lower toggle link 58 being pivotally connected to the frame by the single point connection 64. In both embodiments, said toggle links 56 and 58 are pivotally connected together and said connecting link 53 is connected to a suitable point or points on said toggle links by a single point connection or connections.

In the embodiment shown in Figs. 1-3, said toggle links 56 and 58 are pivotally connected together at a single point by the pin 65 and said connecting link 53 is pivotally connected to a suitable point on said lower toggle link 58 by the single point connection 66. In the embodiment shown in Figs. 1-3, the floating lever functions as a lever of the third class during the closing period, pivoting on the pivot point 44 and having the point 68 to which the end of the piston rod is pivotally attached by the single point connection 70. The guide link 48 is connected to the lower end of the lever 42 by the single fulcrum pin 44 and the guide link 50 is connected to the upper end of the lever by the single fulcrum pin 46. During the closing period, said lever 42 functions as a lever of the third class, with the power being applied to the point 68 thereof by the piston connecting pin 70 and the connecting link 53 being connected to the work output point 55 spaced from the upper end of said lever. After the respective links 48 and 50 have functioned to change the effective leverage of the floating lever 42, it is obvious that it then functions as a lever of the second class with the pivot pin 46 on the end of the guide link 50 serving as a fulcrum with the power applied to the lever at it piston connecting point 68 and the power transmitted to the link 53 by the pin 55 adjacent the upper end of the lever.

In the embodiment of my invention shown in Figs. 6-8, the upper guide link 50' is bent and has the end thereof connected to the lever 42 at a point 46' spaced from the upper end thereof by the fulcrum pin 46' and the connecting link 53' is pivotally connected to the upper end of said floating lever 42 by the pivot pin 55'. The connecting link 53' comprises a guide thrust member having each respective end of the base 72 thereof connected to the opposite ends of said toggle links 56 and 58 at the single points 74 and 76, the upper toggle link 56 being connected to the point 74 at the upper end of the base 72 of said thrust connecting member 53', and the lower toggle link being connected to a point 76 at the lower end of the base 72 of said thrust toggle connecting link member 53'. It is thus obvious that when the floating lever 42 pivots on the fulcrum 44, it functions as a lever of the third class with the power applied at the point 68, and power transmitted at the point 55' on the same side of said fulcrum 44 as said point 68, and that when it pivots on the fulcrum 46' it functions as a lever of the first class to transmit power to said thrust connecting link 53' for transmittal to the pressing lever power arm 30 through the upper link 56 with the power applied at the point 68, and power transmitted at the point 55' on the opposite side of said fulcrum 46' from said point 68.

It is apparent that certain of the links, namely the links 48 and 50 are also transmutable in their functions, functioning alternatively during the respective closing and pressing periods as fulcrums for the floating lever 42 and in the opposite respective periods respectively as guide links, thereby controlling the movement of the floating pressing lever 42 and causing it to change its effective class of leverage and hence effective leverage characteristics during the relatively short transmutation period.

It is obvious that the effective leverage of the mechanism may be readily changed by changing the size and shape of the floating lever and links and their respective points of connection to the piston rod, pressing lever and to each other. The power applying lever means 42, the power transmitting link 53, the lower toggle link 58, the upper toggle link 56 and the transmutable guide links 48 and 50 are so constructed and connected respectively to each other and to said pressing lever and piston rod, and the movement permitted by said link means is such that the device will cause the force transmitted by the piston rod to be transmitted and translated into force, movement and velocity applied to the pressing head 31 in accordance with the curves shown in Fig. 11. An inherent feature of my invention consists of the fact that all the connections between the various members are pivot forming single point connections.

Figure 4:
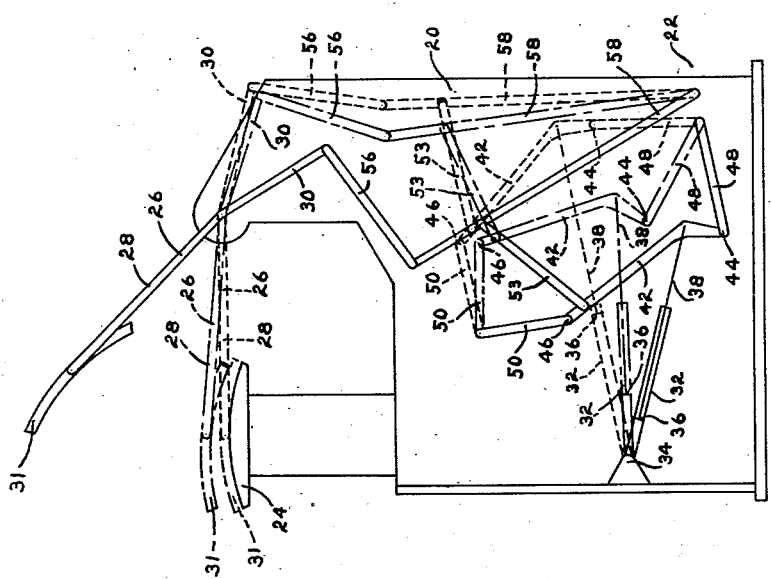
Fig. 4 is a diagrammatic view illustrating component parts of the press and linkage shown in Figs. 1-3, showing the press in open position in full lines, in the intermediate position shown in Fig. 2 in dot-dash lines, and in closed position in dotted lines.

I have shown in Figs. 4 and 9 diagrammatic views illustrating the three positions of the respective different embodiments shown respectively in Figs. 1-3 and Figs. 6-8. In order that the transition of the transmutable functioning characteristics of the floating lever 42 and links 48 and 50 may be more readily understood, I have also shown in Figs. 5 and 10 the characteristic curves of each embodiment, which differ slightly from the preferred curve shown in Fig. 11 which is a composite curve made up of the most desirable characteristics of the embodiment shown in Figs. 1-3 and Figs. 6-8 and of the embodiments shown in said joint application aforesaid. One reason why these curves differ slightly in the different types of linkages employed is that in each instance it is desirable first to secure a straight line increment of movement supplied during the press closing period and a substantially constant slightly increasing straight line increment of movement supplied during the pressing period for the reasons hitherto advanced. It is apparent from an inspection of Figs. 4 and 9 and the corresponding figures in the joint application that all respective movements of the controlling portions of the levers and linkages are curvilinear, and in order to obtain these straight line movements aforesaid, a curvilinear movement in one direction must generally be balanced by a curvilinear movement in the opposite direction, and these counterbalancing movements in order to obtain straight line increment portions in the respective curves must be counterbalanced, and it is apparent that the desired curve is obtained by a nice empirical balancing of the respective curvilinear movements of the respective elements in the different embodiments shown. It is apparent, however, from an inspection of Figs. 5 and 10 and the corresponding graphs in the joint application aforesaid that all of these graphs or curves are substantially similar to the ideal graphs or curves shown in Fig. 11. As stated, the number, size, shape and location of the single point connections for the various levers and links shown in this application and in said joint application may be computed mathematically.

It is obvious, however, that certain structural features of my improved linkage system are novel whether or not they function in accordance with the aforementioned curves.

It is understood that my invention is not limited to the specific embodiment shown and that various deviations may be made therefrom without departing from the spirit and scope of the appended claims.

What I claim is:

1. In a garment pressing machine, a frame, a pressing buck mounted on said frame, a pressing lever of the first class pivotally mounted on said frame having a power arm, a pressing head mounted on said pressing lever to move to a closed position into pressing contact with said buck and to an open position away therefrom pivotally mounted motor means for actuating said pressing lever, means urging said pressing lever to an open position, mechanism connecting said motor means to the power arm of said pressing lever consisting solely of rigid pivoting connecting members comprising power applying lever means pivotable substantially entirely on one closing movement fulcrum to apply a rapid movement and a small force to said pressing head and pivotable substantially entirely on another power applying fulcrum to also apply a slow movement and a large force to said pressing head, power transmitting means pivotably connected to said pressing lever at a single point, and rigid link means so connecting said power applying lever means to said power transmitting means and said power applying lever means to said frame with single point connections that said power applying lever means may pivot substantially entirely on one fulcrum to apply a rapid movement and a small force to said pressing head and said power applying lever means may pivot substantially entirely on the other fulcrum to apply a slow movement and a large force to said pressing head, the motor means being pivotally connected in such a manner to a single point on said lever means, and said power applying lever means, power transmitting means and interconnecting link means being so constructed, guided and so connected respectively to each other by single point connections only as to transmit to said pressing head the substantially even force supplied by said motor means against the force of said urging means while actuating said pressing lever, transforming it into a relatively extremely light force applied to said pressing head during its closing period and a relatively extremely heavy substantially constant force applied to said pressing head during its pressing period after an extremely short intermediate rapid force increasing transmutation fulcrum changing period during which said pressing head contacts said buck; and also transforming said even force to cause an extremely rapid relative movement of said pressing head during its closing period and a relatively slow movement of said pressing head during its pressing period after said extremely short intermediate transmutation period.

2. In a garment pressing machine, a frame, a pressing buck mounted on said frame, a pressing lever of the first class pivotally mounted on said frame having a power arm, a pressing head mounted on said pressing lever to move to a closed position into pressing contact with said buck and to an open position away therefrom, pivotally mounted motor means for actuating said pressing lever, means urging said pressing lever to an open position, mechanism connecting said motor means to the power arm of said pressing lever consisting solely of rigid pivoting connecting members comprising a floating power applying lever pivotable substantially entirely on a single closing movement fulcrum to apply a rapid movement and a small force to said pressing head and pivotable substantially entirely on another power applying fulcrum to apply a relatively slow movement and a large force to said pressing head during the application of input force by said motor means, guide means pivotally mounted at a single point on said frame and pivotally connected to said floating power applying lever at a single point to provide the closing movement fulcrum thereof and to guide the movement thereof to substantially control the movement of said pressing head while applying the slow movement and the large force to the pressing head and guide means pivotally mounted on said frame at a single point and pivotally connected to said floating power applying lever at a single point to provide the pressure applying fulcrum thereof and to guide the movement thereof to substantially control the movement of said pressing head while being closed into pressing position, and power transmitting means pivotally connected to said floating lever at a single point and to said pressing lever at a single point, the motor means being pivotally connected in such a manner to a single point on the floating lever, the power transmitting means being so constructed and connected to such a single point on said floating lever and the movement permitted by said guide means being such as to transmit to said pressing head the substantially even force supplied by said motor means against the force of said urging means while actuating said pressing lever, while transforming it into a relatively extremely light force applied to said pressing head during its closing period and a relatively extremely heavy substantially constant force applied to said pressing head during its pressing period after an extremely short intermediate rapid force increasing transmutation fulcrum changing period during which said pressing head contacts said buck; and also transforming said even force to cause an extremely rapid relative movement of said pressing head during its closing period and a relatively slow movement of said pressing head during its pressing period after said extremely short intermediate transmutation period.

3. In a garment pressing machine, a frame, a pressing buck mounted on said frame, a pressing lever of the first class pivotally mounted on said frame having a power arm, a pressing head mounted on said pressing lever to move to a closed position into pressing contact with said buck and to an open position away therefrom, pivotally mounted motor means for actuating said pressing lever, means urging said pressing lever to an open position, mechanism connecting said motor means to the power arm of said pressing lever consisting solely of rigid pivoting connecting members comprising power applying lever means pivotable substantially entirely on a single closing movement fulcrum to function as a lever having one characteristic to apply a rapid movement and a small force to said pressing head and pivotable substantially entirely on another power applying fulcrum to function as a lever having a different characteristic to apply a slow movement and a large force to said pressing head, during the application of input force by said motor means, transmutable link means pivotally mounted by single point connections on said frame and pivotally connected to said power applying lever means by single point connections, one of said link means having a single point connection functioning to provide the closing movement fulcrum of said power applying lever means and another of said link means having a single point connection successively functioning to provide the pressure applying fulcrum of said power applying lever means, and each of said fulcrum providing transmutable link means functioning to guide the movement of said lever means to substantially control the movement of the pressing head when not functioning as a fulcrum providing means, and both of said means functioning to guide said lever means to rapidly change the respective fulcrums thereof after a predetermined pivotal movement thereof to provide a short transmutation period in which the functioning characteristics of said lever means rapidly change, and power transmitting means pivotally connected to said lever means by single point connecting means and to said pressing lever at a single point, the motor means being pivotally connected in such a manner to a single point on the lever, said power applying lever means, power transmitting means and transmutable link means being so constructed and so connected respectively to each other by said single point connections only and the movement permitted by said link means being such as to transmit to said pressing head the substantially even force supplied by said motor means against the force of said urging means while actuating said pressing lever, while transforming it into a relatively extremely light force applied to said pressing head during its closing period and a relatively extremely heavy substantially constant force applied to said pressing head during its pressing period after an extremely short intermediate rapid force increasing transmutation fulcrum changing period during which said pressing head contacts said buck; and also transforming said even force to cause an extremely rapid relative movement of said pressing head during its closing period and a relatively slow movement of said pressing head during its pressing period after said extremely short intermediate transmutation period.

4. In a garment pressing machine, a frame, a pressing buck mounted on said frame, a pressing lever of the first class pivotally mounted on said frame having a power arm, a pressing head mounted on said pressing lever to move to a closed position into pressing contact with said buck and to an open position away therefrom, pivotally mounted motor means for actuating said pressing lever, means urging said pressing lever to an open position, mechanism connecting said motor means to the power arm of said pressing lever consisting solely of rigid pivoting connecting members, comprising a floating power applying lever pivotable substantially entirely on a single closing movement fulcrum to function as a lever of one class to apply a rapid movement and a light force to said pressing head and pivotable substantially entirely on another power applying fulcrum to function as a lever of a different class to apply a slow movement and a large force to said pressing head, during the application of input force by said motor means, a pair of guide means pivotally mounted on single points on said frame and connected to said floating lever at single points, one of said guide means functioning to act as the closing movement fulcrum and the other of said guide means functioning successively to act as the pressing movement fulcrum, each of said guide means functioning to guide said floating lever while pivoting on the other fulcrum, and both of said guide means functioning to guide said floating lever to rapidly change the respective fulcrums thereof to provide a short transmutation period in which the functioning characteristics of said floating lever rapidly change from those of the respective classes, and power transmitting means pivotally connected to said floating lever at a single point and to said pressing lever at a single point, said motor means being pivotally connected in such a manner to a single point on the floating lever, the power transmitting means being so constructed and connected in such a manner to a single point on said floating lever and the movement permitted by said guide means being such as to transmit to said pressing head the substantially even force supplied by said motor means against the force of said urging means while actuating said pressing lever, while transforming it into a relatively extremely light force applied to said pressing head during its closing period and a relatively extremely heavy substantially constant force applied to said pressing head during its pressing period after an extremely short intermediate rapid force increasing transmutation fulcrum changing period during which said pressing head contacts said buck; and also transforming said even force to cause an extremely rapid relative movement of said pressing head during its closing period and a relatively slow movement of said pressing head during its pressing period after said extremely short intermediate transmutation period.

5. In a garment pressing machine, a frame, a pressing buck mounted on said frame, a pressing lever of the first class pivotally mounted on said frame having a power arm, a pressing head mounted on said pressing lever to move to a closed position into pressing contact with said buck and to an open position away therefrom, pivotally mounted motor means for actuating said pressing lever, means urging said pressing lever to an open position, mechanism connecting said motor means to the power arm of said pressing lever consisting solely of rigid pivoting connecting members, comprising, a floating power applying lever having the motor means pivotally connected thereto at a single point intermediate the ends thereof, said power applying lever being pivotable substantially entirely on a single closing movement fulcrum at one end thereof to function as a lever of the third class to apply a rapid movement and a small force to said pressing head and pivotable substantially entirely on another power applying fulcrum at the other end thereof to function as a lever of the second class to apply a slow movement and a large force to said pressing head, during the application of input force by said motor means, a link guide means pivotally mounted on a single point on said frame and pivotally connected to said floating power applying lever at a single point at said first mentioned end thereof to provide the closing movement fulcrum thereof and to guide the movement thereof to substantially control the movement of said pressing head while applying a slow movement and a heavy force to the garment being pressed and a link guide means pivotally mounted on said frame on a single point and pivotally connected to said floating power applying lever at a single point at the other end thereof to provide the pressure applying fulcrum thereof and to guide the movement thereof to substantially control the movement of said pressing head while being closed into pressing position, and power transmitting means pivotally connected to said floating lever by a single point connecting means adjacent said other end thereof and to said pressing lever at a single point, the power transmitting means being so constructed and the movement permitted by said guide means being such as to transmit to said pressing head the substantially even force supplied by said motor means against the force of said urging means while actuating said pressing lever, while transforming it into a relatively extremely light force applied to said pressing head during its closing period and a relatively extremely heavy substantially constant force applied to said pressing head during its pressing period after an extremely short intermediate rapid force increasing transmutation fulcrum changing period during which said pressing head contacts said buck; and also transforming said even force to cause an extremely rapid relative movement of said pressing head during its closing period and a relatively slow movement of said pressing head during its pressing period after said extremely short intermediate transmutation period.

6. In a garment pressing machine, a frame, a pressing buck mounted on said frame, a pressing lever of the first class pivotally mounted on said frame having a power arm, a pressing head mounted on said pressing lever to move to a closed position into pressing contact with said buck and to an open position away therefrom, pivotally mounted motor means for actuating said pressing lever, means urging said pressing lever to an open position, mechanism connecting said motor means to the power arm of said pressing lever consisting solely of rigid pivoting connecting members, comprising, a floating power applying lever having the motor means pivotally connected thereto at a single point intermediate the ends thereof, said power applying lever being pivotable substantially entirely on a single closing movement fulcrum at one end thereof to function as a lever of the third class to apply a rapid movement and a small force to said pressing head and pivotable substantially entirely on another power applying fulcrum at the other end thereof to function as a lever of the second class to apply a slow movement and a large force to said pressing head, during the application of input force by said motor means, a link guide means pivotally mounted on a single point on said frame and pivotally connected to said floating power applying lever at a single point at said first mentioned end thereof to provide the closing movement fulcrum thereof and to guide the movement thereof to substantially control the movement of said pressing head while applying a slow movement and a heavy force to the garment being pressed and a link guide means pivotally mounted on said frame on a single point and pivotally connected to said floating power applying lever at a single point at the other end thereof to provide the pressure applying fulcrum thereof and to guide the movement thereof to substantially control the movement of said pressing head while being closed into pressing position, and a toggle comprising an upper link pivotally connected to the pressing lever and a lower link pivotally mounted on the frame, said links having the opposite ends thereof pivotally connected together, a connecting link having one end thereof pivotally connected to said toggle at a single point and the other end pivotally connected to a single point on said floating lever adjacent said other end thereof, said levers and links being so connected and the movement permitted by said guide means being such as to transmit to said pressing head the substantially even force supplied by said motor means against the force of said urging means while actuating said pressing lever, while transforming it into a relatively extremely light force applied to said pressing head during its closing period and a relatively extremely heavy substantially constant force applied to said pressing head during its pressing period after an extremely short intermediate rapid force increasing transmutation fulcrum changing period during which said pressing head contacts said buck; and also transforming said even force to cause an extremely rapid relative movement of said pressing head during its closing period and a relatively slow movement of said pressing head during its pressing period after said extremely short intermediate transmutation period.

7. In a garment pressing machine, a frame, a pressing buck mounted on said frame, a pressing lever of the first class pivotally mounted on said frame having a power arm, a pressing head mounted on said pressing lever to move to a closed position into pressing contact with said buck and to an open position away therefrom, pivotally mounted motor means for actuating said pressing lever, means urging said pressing lever to an open position, mechanism connecting said motor means to the power arm of said pressing lever consisting solely of rigid pivoting connecting members, comprising, a floating power applying lever having the motor means pivotally connected thereto at a single point intermediate the ends thereof, said power applying lever being pivotable substantially entirely on a single closing movement fulcrum at one end thereof to function as a lever of the third class to apply a rapid movement and a small force to said pressing head and pivotable substantially entirely on another power applying fulcrum adjacent the other end thereof to function as a lever of the first class to apply a slow movement and a large force to said pressing head, during the application of input force by said motor means, link guide means pivotally mounted on a single point on said frame and pivotally connected to said floating power applying lever at a single point at the first mentioned end thereof to provide the closing movement fulcrum thereof and to guide the movement thereof to substantially control the movement of said pressing head while applying a slow movement and a heavy force to the garment being pressed and link guide means pivotally mounted on said frame at a single point and pivotally connected to said floating power applying lever at a single point adjacent the other end thereof to provide the pressure applying fulcrum thereof and to guide the movement thereof to substantially control the movement of said pressing head while being closed into pressing position and power transmitting means pivotally connected to said floating lever by single point connecting means at the other end thereof and to said pressing lever at a single point, the power transmitting means being so constructed, said levers and links being so constructed and the movement permitted by said guide means being such as to transmit to said pressing head the substantially even force supplied by said motor means against the force of said urging means while actuating said pressing lever, while transforming it into a relatively extremely light force applied to said pressing head during its closing period and a relatively extremely heavy substantially constant force applied to said pressing head during its pressing period after an extremely short intermediate rapid force increasing transmutation fulcrum changing period during which said pressing head contacts said buck; and also transforming said even force to cause an extremely rapid relative movement of said pressing head during its closing period and a relatively slow movement of said pressing head during its pressing period after said extremely short intermediate transmutation period.

8. In a garment pressing machine, a frame, a pressing buck mounted on said frame, a pressing lever of the first class pivotally mounted on said frame having a power arm, a pressing head mounted on said pressing lever to move to a closed position into pressing contact with said buck and to an open position away therefrom, pivotally mounted motor means for actuating said pressing lever, means urging said pressing lever to an open position, mechanism connecting said motor means to the power arm of said pressing lever consisting solely of rigid pivoting connecting members, comprising a floating power applying lever having the motor means pivotally connected thereto at a single point intermediate the ends thereof, said power applying lever being pivotable substantially entirely on a single closing movement fulcrum at one end thereof to function as a lever of the third class to apply a rapid movement and a small force to said pressing head and pivotable substantially entirely on another power applying fulcrum adjacent the other end thereof to function as a lever of the first class to apply a slow movement and a large force to said pressing head, during the application of input force by said motor means, link guide means pivotally mounted on a single point on said frame and pivotally connected to said floating power applying lever at a single point at the first mentioned end thereof to provide the closing movement fulcrum thereof and to guide the movement thereof to substantially control the movement of said pressing head while applying a slow movement and a heavy force to the garment being pressed and link guide means pivotally mounted on said frame at a single point and pivotally connected to said floating power applying lever at a single point adjacent the other end thereof to provide the pressure applying fulcrum thereof and to guide the movement thereof to substantially control the movement of said pressing head while being closed into pressing position and a toggle comprising an upper link pivotally connected to the pressing lever and a lower link pivotally mounted on the frame, a triangular thrust member having the ends of the base thereof pivotally connected to the opposite ends of said links at single points and the apex thereof pivotally connected to a single point on the other end of said floating lever, said levers and links being so constructed and the movement permitted by said guide means being such as to transmit to said pressing head the substantially even force supplied by said motor means against the force of said urging means while actuating said pressing lever, while transforming it into a relatively extremely light force applied to said pressing head during its closing period and a relatively extremely heavy substantially constant force applied to said pressing head during its pressing period after an extremely short intermediate rapid force increasing transmutation fulcrum changing period during which said pressing head contacts said buck; and also transforming said even force to cause an extremely rapid relative movement of said pressing head during its closing period and a relatively slow movement of said pressing head during its pressing period after said extremely short intermediate transmutation period.

9. In a garment pressing machine, a frame, a pressing buck mounted on said frame, a pressing lever of the first class pivotally mounted on said frame having a power arm, a pressing head mounted on said pressing lever to move to a closed position into pressing contact with said buck and to an open position away therefrom, pivotally mounted motor means for actuating said pressing lever, means urging said pressing lever to an open position, mechanism connecting said motor means to the power arm of said pressing lever, consisting solely of rigid pivoting connecting members, comprising a power applying floating lever, a pair of spaced pivotal means, constraining means pivotally connected to said pivotal means and to spaced points on said floating lever to constrain said spaced points to arcuate paths with respect to said pivotal means and rigid means pivotally connecting said mechanism to said pressing lever power arm and to said motor means, certain of said constraining means being transmutable to alternately function as successive fulcrums for said floating power applying lever and as guide means for said floating power applying lever, said floating power applying lever, said constraining means and said rigid means being so constructed and connected respectively to each other and to said pressing lever power arm and the movement permitted by said constraining means being such as to transmit to said pressing head the substantially even force supplied by said motor means against the force of said urging means while actuating said pressing lever, while transforming it into a relatively extremely light force applied to said pressing head during its closing period and a relatively extremely heavy substantially constant force applied to said pressing head during its pressing period after an extremely short intermediate rapid force increasing transmutation fulcrum changing period during which said pressing head contacts said buck; and also transforming said even force to cause an extremely rapid relative movement of said pressing head during its closing period and a relatively slow movement of said pressing head during its pressing period after said extremely short intermediate transmutation period.

10. In a garment pressing machine, a frame, a pressing buck mounted on said frame, a pressing lever of the first class pivotally mounted on said frame having a power arm, a pressing head mounted on said pressing lever to move to a closed position into pressing contact with said buck and to an open position away therefrom, pivotally mounted motor means for actuating said pressing lever, means urging said pressing lever to an open position, mechanism connecting said motor means to the power arm of said pressing lever, consisting solely of rigid pivoting connecting members, comprising a power applying floating lever, a pair of spaced pivotal means, constraining means connected to said pivotal means and to spaced points on said floating lever to constrain said spaced points to generally arcuate paths with respect to said pivotal means and rigid means pivotally connecting said mechanism to said pressing lever power arm and to said motor means, certain of said constraining means being transmutable to alternately function as successive fulcrums for said floating power applying lever and as guide means for said floating power applying lever, said floating power applying lever, said constraining means and said rigid means being so constructed and connected respectively to each other and to said pressing lever power arm and the movement permitted by said constraining means being such as to transmit to said pressing head the substantially even force supplied by said motor means against the force of said urging means while actuating said pressing lever, while transforming it into a relatively extremely light force applied to said pressing head during its closing period and a relatively extremely heavy substantially constant force applied to said pressing head during its pressing period after an extremely short intermediate rapid force increasing transmutation fulcrum changing period during which said pressing head contacts said buck; and also transforming said even force to cause an extremely rapid relative movement of said pressing head during its closing period and a relatively slow movement of said pressing head during its pressing period after said extremely short intermediate transmutation period.

FRANK C. LORNITZO.

REFERENCES CITED

The following references are of record in the file of this patent:

UNITED STATES PATENTS

| Number | Name | Date |
|---|---|---|
| 368,347 | Massey | Aug. 16, 1887 |
| 1,633,260 | Ledbetter | June 21, 1927 |
| 1,653,192 | Stocker et al. | Dec. 20, 1927 |
| 1,680,729 | Davis | Aug. 14, 1928 |
| 1,689,744 | Neuroth | Oct. 30, 1928 |
| 1,747,870 | Pauly | Feb. 18, 1930 |
| 1,754,387 | Hall | Apr. 15, 1930 |
| 1,800,680 | Davis | Apr. 14, 1931 |
| 1,820,051 | Davis | Aug. 25, 1931 |
| 1,822,613 | Clarke | Sept. 8, 1931 |
| 1,837,018 | Davis | Dec. 15, 1931 |
| 2,005,019 | Bertrand | June 18, 1935 |
| 2,026,264 | Beede | Dec. 31, 1935 |
| 2,051,739 | Page | Aug. 18, 1936 |
| 2,211,438 | Schnell | Aug. 13, 1940 |
| 2,250,715 | Lauer et al. | July 29, 1941 |

FOREIGN PATENTS

| Number | Country | Date |
|---|---|---|
| 76,714 | Switzerland | Feb. 1, 1918 |
| 313,353 | Great Britain | June 13, 1929 |
| 525,242 | Germany | May 21, 1931 |
| 345,225 | Great Britain | 1931 |
| 503,839 | Great Britain | Apr. 11, 1939 |
| 504,727 | Great Britain | Apr. 28, 1939 |

OTHER REFERENCES

"Five Hundred and Seven Mechanical Movements" (13 Edn.) by H. T. Brown, published (1881) by Brown and Brown, New York—page 84 only.